(No Model.)
J. CLARK.
DIVISIBLE TOE WEIGHT.
No. 522,288. Patented July 3, 1894.
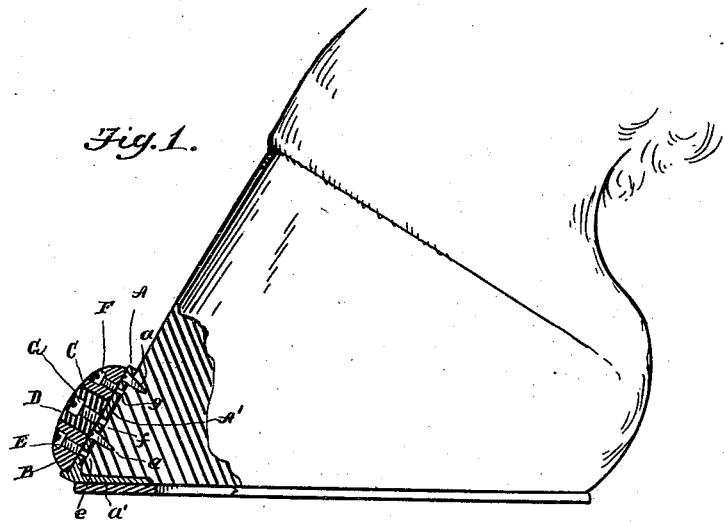
Fig. 1.
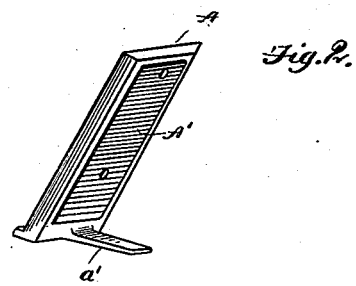
Fig. 2.
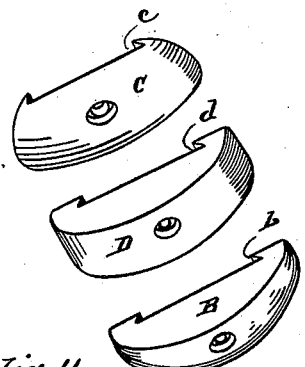
Fig. 6.
Fig. 5.
Fig. 4.
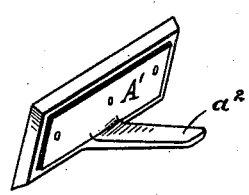
Fig. 3.
WITNESSES
F. Clough.
D. W. Bradford.
INVENTOR
John Clark
By Parker & Burton
Attorneys.

UNITED STATES PATENT OFFICE.

JOHN CLARK, OF DETROIT, MICHIGAN.

DIVISIBLE TOE-WEIGHT.

SPECIFICATION forming part of Letters Patent No. 522,288, dated July 3, 1894.

Application filed December 6, 1893. Serial No. 492,932. (No model.)

*To all whom it may concern:*

Be it known that I, JOHN CLARK, a citizen of the United States, residing at Detroit, county of Wayne, State of Michigan, have invented certain new and useful Improvements in Toe-Weights; and I declare the following to be a full, clear, and exact description of the invention, such as will enable others skilled in the art to which it pertains to make and use the same, reference being had to the accompanying drawings, which form a part of this specification.

My invention relates to toe weights of the style which is usually wholly or in part attached to the hoof of a horse by means of screws; and it consists in the peculiar arrangement and combination hereinafter described and claimed.

In the drawings, Figure 1 is a sectional view of a toe weight represented as attached to the hoof of the horse. Fig. 2 represents the plate to which the several hereinafter described sections of additional weights are attached. Fig. 3 represents a modification thereof. Figs. 4, 5 and 6 represent removable sections.

Similar letters refer to similar parts.

In the drawings, A represents a base plate adapted to be attached to the hoof of a horse by means of the screws $a\, a$, and the tang $a'$ interposed between the hoof and the shoe. The hoof side of this base plate is preferably covered by an elastic material firmly cemented in the base plate in question, which is shown in Figs. 1 and 2 at $A'$. This prevents the working of dirt between the base plate and the hoof, and also cushions the hoof against any shocks or jars due to its striking against solid substances with the weights attached to the base plate as hereinafter described. The under side of the base plate is narrower than the outer side, the sides being beveled.

In Fig. 3 the base plate is shown occupying a parallel position with reference to the base of the hoof, with the tang $a^2$ fashioned from the center of one of its edges. It often happens that horses step somewhat unevenly upon their feet, and, with a toe weight constructed as in Fig. 3, the weights can be shifted with reference to the perpendicular central line of the hoof without disturbing the base plate. The base plate $A^2$ has preferably upon its under side a similar padding of elastic material to that shown at $A'$ in Fig. 2.

Figs. 4 and 6 illustrate the lower and upper sectional weights B and C, while Fig. 5 illustrates the intermediate weight D. The sectional weights B and C are beveled off upon one side of each, the opposite faces being cut off squarely, and are adapted to fit the two square faces of the intermediate weight D. Upon the interior flat sides are cut dovetailed slots, as shown at $b$, $c$, $d$. These are so proportioned that they fit the base plates A, $A^2$, and are capable of sliding upon the same from end to end, they being held from moving by means of the set screws E, F, G. The inner ends of these screws at $e$, $f$, $g$, are preferably made smaller and smooth, for the purpose of entering in holes in the base plates, and thus positively preventing the weights B, C, D, from sliding thereon when the screws are forced home. It will be noticed that the weights are divided by lines which are perpendicular to the planes of the base plates, which permits of an adjustment longitudinally therewith, whether the plate be arranged with regard to the hoof as shown in Fig. 2 or Fig. 3, which longitudinal adjustment with reference to the base plate is of importance when only one or two of the several weights are desired to be used, as it or they can be adjusted in different positions on the plate.

In practice, the base plates A and $A^2$ are made to weigh one ounce each; the weight C also weighs one ounce; the weight B weighs two ounces, and the weight D weighs three ounces. As either one of the three weights, or all of them, B, C, D, may be adjusted on the base plate, or either one of them or two of them left off, it is obvious that six different combinations of weights can be made, each varying from the other in weight. This is important, as it often happens that the throw of a horse's foot is varied by the wearing of shoes or by other circumstances, and it becomes necessary to either increase or decrease the weight that it has attached, for the purpose of making the ultimate weight uniform.

It is obvious that the toe weight best adapted for adjustment, and which contains the greater variety of adjustable changes in weight, is preferable in use for some purposes.

What I claim is—

1. In a toe weight, the combination of a base plate, means for attaching the same to the hoof of a horse, sections of a divisible weight, each adapted to be separately attached to the base plate without reference to the mode of attachment of the others, in such manner that the whole may constitute an adjustable toe weight, the lines of division between the said several weights being substantially at right angles to the plane of the base plate, substantially as described.

2. A toe weight, consisting of the combination of a base plate, means for attaching the same to the hoof, supplemental weights, and means for attaching the same to the base plate, the supplemental weights and base plate being so arranged that the combinations can be adjusted in a line parallel with the plane of the bottom of the foot, substantially as and for the purposes set forth.

In testimony whereof I sign this specification in the presence of two witnesses.

JOHN CLARK.

Witnesses:
R. A. PARKER,
MARION A. REEVE.